(12) United States Patent
Kuffel et al.

(10) Patent No.: US 8,037,514 B2
(45) Date of Patent: Oct. 11, 2011

(54) METHOD AND APPARATUS FOR SECURELY DISSEMINATING SECURITY SERVER CONTACT INFORMATION IN A NETWORK

(75) Inventors: Irene H. Kuffel, Napa, CA (US);
Wilson Kok, San Jose, CA (US);
Michael Fine, San Francisco, CA (US);
Fabio R. Maino, Palo Alto, CA (US);
Jed Lin Lau, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1223 days.

(21) Appl. No.: 11/069,857

(22) Filed: Mar. 1, 2005

(65) Prior Publication Data
US 2006/0200670 A1    Sep. 7, 2006

(51) Int. Cl.
*G06F 15/16* (2006.01)
*H04L 29/06* (2006.01)
*H04L 9/32* (2006.01)

(52) U.S. Cl. ............... 726/5; 726/4; 713/155; 713/168; 713/169; 713/170

(58) Field of Classification Search ............... None
See application file for complete search history.

(56) References Cited

U.S. PATENT DOCUMENTS

| | | | |
|---|---|---|---|
| 6,161,185 A * | 12/2000 | Guthrie et al. | 726/5 |
| 6,453,353 B1 * | 9/2002 | Win et al. | 709/229 |
| 7,181,530 B1 * | 2/2007 | Halasz et al. | 709/238 |
| 7,299,354 B2 * | 11/2007 | Khanna et al. | 713/165 |
| 2005/0074126 A1 * | 4/2005 | Stanko | 380/279 |

OTHER PUBLICATIONS

A. Gulbrandsen et al, RFC 2782, "A DNS RR for Specifying the Location of Services (DNS SRV)," Network Working Group—Standards Track, Feb. 2000, pp. 1-12.

* cited by examiner

*Primary Examiner* — Nasser Moazzami
*Assistant Examiner* — Fatoumata Traore
(74) *Attorney, Agent, or Firm* — Campbell Stephenson LLP

(57) ABSTRACT

Various systems and method are disclosed for disseminating security server contact information in a network. For example, one method (e.g., performed by a security server) involves determining that a network device is a secure network device, in response to participating in a security exchange with the network device; and then sending a server list to the network device. The server list includes the network address of at least one security server. Another method (e.g., performed by a network device) involves initiating an authentication exchange; receiving a server list, which includes the network address of a security server, as part of the authentication exchange; and communicating with the security server by sending a packet to the network address included in the server list.

25 Claims, 7 Drawing Sheets

METHOD AND APPARATUS FOR SECURELY DISSEMINATING SECURITY SERVER CONTACT INFORMATION IN A NETWORK

FIELD OF THE INVENTION

This invention relates to networking and, more particularly, to performing authentication and authorization within a network.

BACKGROUND

Authentication and authorization protocols are used to secure networks. Authentication protocols are used to provide network devices with authenticated access to a network. In particular, authentication protocols are used to authenticate each port coupled to a particular link. If an authentication protocol exchange fails, a port connected to the link that was being authenticated by the exchange can be disabled from communicating via the link.

IEEE 802.1X defines a protocol for authenticating an Ethernet link. In the IEEE 802.1X model, two network devices communicate via the link being authenticated. When the link is brought up, one of the two network devices acts as an authenticator device while the other one of the two network devices acts as a supplicant device. The behavior of the authenticator device and the supplicant device is defined by IEEE 802.1X. In particular, the authenticator device communicates with an authentication server in order to authenticate the link to supplicant device. In situations in which the authenticator device and the authentication server are not co-located, the authenticator device needs to have layer 3 connectivity with the authentication server in order to be able to complete the IEEE 802.1X protocol exchange.

Authorization protocols such as RADIUS (Remote Authentication Dial In User Service) provide security policy to network devices in order to inform those network devices of the traffic that neighboring network devices are authorized to send on the network. A network device can obtain policy for each port from the authorization server. Based on the security policy provided by the authorization server, a network device can filter traffic sent by a neighboring network device in order to ensure that only authorized traffic is sent via the network.

A network can be designed to enforce authenticated and authorized access pervasively, for all network devices on all links. Ideally, when such a network is brought up, successful authentication (and as a result, connectivity with an authentication and authorization server) will start from the devices closest (i.e., separated by the fewest number of links) to an authentication and authorization server and propagate outwards. Links to supplicant devices closest to the authentication and authorization server will be authenticated, allowing the supplicant devices to subsequently act as authenticator devices. The new authenticator devices are then able to authenticate other devices that are further (in links) from the authentication and authorization server. After being authenticated, each network device uses the authorization protocol to obtain policy information from the authentication and authorization server.

During the process of securing the network, each network device has to be authenticated and authorized by contacting an authentication and authorization server whenever that network device tries to bring up a link with a neighboring network device. Accordingly, in order to be able to contact the authentication and authorization server, each network device needs to have information detailing how to contact the server. That information can include the location (e.g., Internet Protocol (IP) address and Layer 4 (L4 port)) of the server. In order to provide high availability and scalability, more than one server may be deployed in the network. As a result, each network device may need to have contact information for more than one of the authentication and authorization servers.

Currently, a network administrator needs to manually configure the authentication and authorization servers' contact information on each network device within the network. This technique is clearly time consuming and error prone, especially as networks increase in size.

Allowing network devices to dynamically discover authentication and authorization server contact information eliminates the need for manual configuration. Dynamic Name Service (DNS) SRV Record, as described in Request For Comments (RFC) 2782, is an existing mechanism that allows network devices to request server contact information by contacting a DNS server. However, this mechanism requires that the network device that is requesting the server contact information have IP connectivity with the DNS server.

In some networks, having IP connectivity on a link depends on a network device successfully completing authentication and authorization of a peer on the other side of the link. In order to authenticate and authorize the peer, the network device needs to be able to contact the security server. In certain situations, the network device will be unable to contact a DNS server until the authentication and authorization of the peer has completed. For example, the DNS server may not yet be inside the secured fabric (and thus the DNS server will not be reachable via IP) when the network device tries to locate the authentication and authorization server in order to be able to authenticate and authorize the peer.

Accordingly, the network device cannot use the dynamic discovery mechanism to obtain the server contact information. This dependency renders the dynamic discovery solution ineffective in certain environments. Even worse, if the DNS SRV Record mechanism is the only mechanism by which the network device can obtain server contact information for the authentication and authorization server, deadlock situations can occur if the particular link being authenticated is the only path towards the DNS server for the network device. As this example shows, improved techniques for configuring each network device with server contact information are desirable.

BRIEF DESCRIPTION OF THE DRAWINGS

A more complete understanding of the present invention may be acquired by referring to the following description and the accompanying drawings, in which like reference numbers indicate like features.

Figure 1:
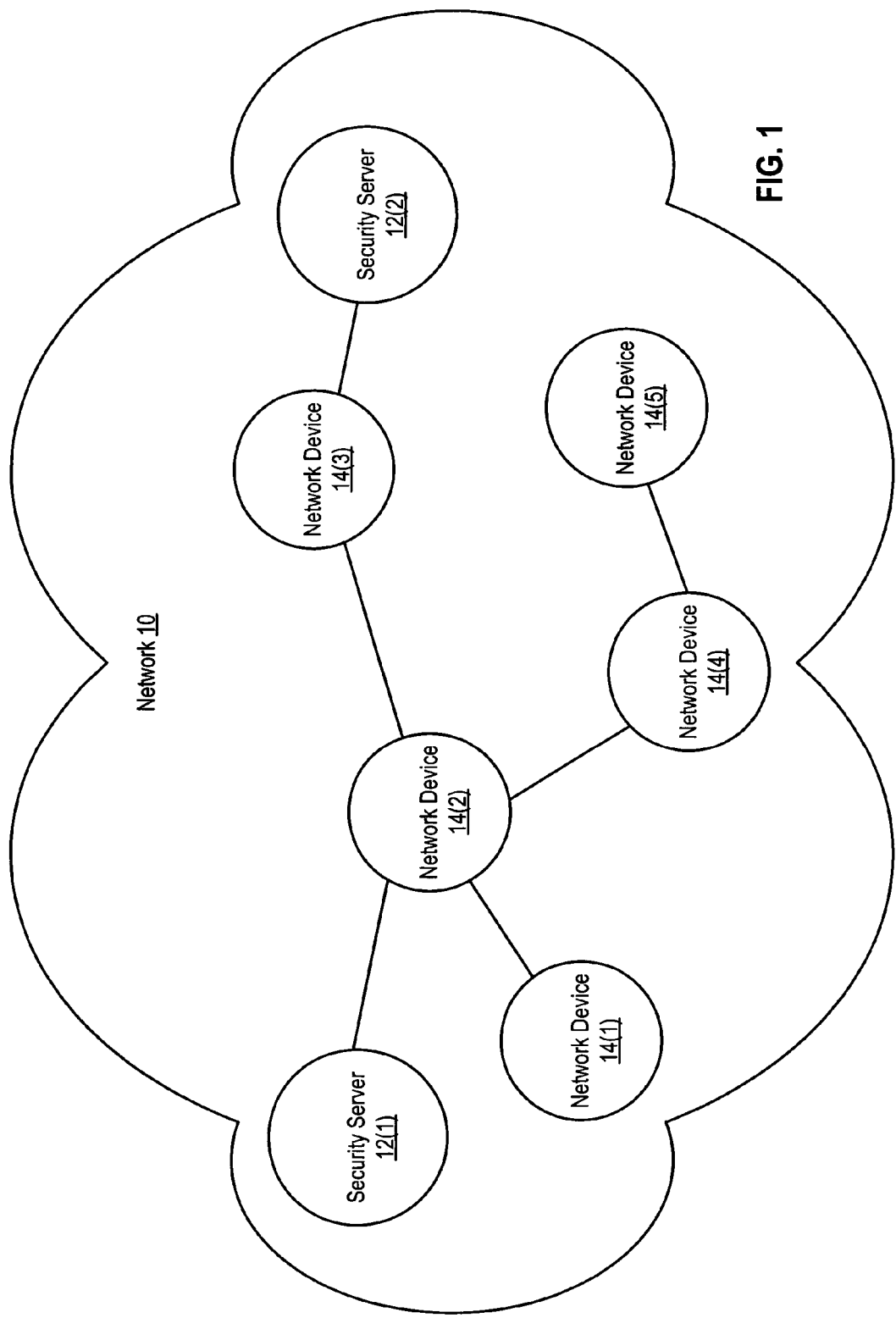
FIG. 1 is a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Security server contact information (also referred to herein as a server list) for one or more security servers is dynamically propagated throughout a network. As part of a security exchange, a security server provides security server contact information to a network device. Accordingly, manual configuration of the security server contact information on the network device is not necessary.

In some embodiments, security server contact information is provided to network devices during security exchanges only after those network devices have been determined to be secured (e.g., by participating in both an authentication and an authorization exchange with a security server, or by providing appropriate credentials to a security server during a security exchange). In such situation, the initial security exchange is supported by an access point network device, which is already part of the secured network, that acts as a relay for the authentication/authorization messages used in the security exchange. The unsecured network device has L2 connectivity with the access point, which can be the security server itself in some situations. The access point can relay authentication and/or authorization messages, received from the unsecured network device over an L2 link, to the security server, and vice versa. The access point has full access to the security server, since the access point is already part of the secured network.

Thus, devices that are already secured can operate as proxies in order to propagate server contact information to unsecured devices through the network. For example, after a network device successfully completes the security exchange and thus becomes a secured network device, another network device, which is coupled to the security server by the secured network device, can then participate in a security exchange with the security server, using the secured network device as a proxy. In its role as proxy, the secured network device uses the security server contact information to contact the security server. During this security exchange, the other network device receives security server contact information from the security server. Thus, the security server contact information can be automatically propagated through the network as part of secured traffic exchanges with adjacent network devices that have already been authenticated and authorized.

FIG. 1 is a block diagram of a network. As shown, network 10 includes two security servers 12(1)-12(2), as well as five network devices 14(1)-14(5). Security server 12(1) is coupled directly to network device 14(2). Security server 12(2) is coupled directly to network device 14(3). Network device 14(1), 14(4), and 14(5) are coupled to security servers 12(1) and 12(2) indirectly via network devices 14(2) and 14(3). As shown, network device 14(1) is coupled to security server 12(1) by network device 14(2). Network device 14(4) is coupled to security server 12(1) by network device 14(2). Network device 14(5) is coupled to security server 12(1) by network devices 14(2) and 14(4). It is noted that other embodiments can include different numbers and arrangements of network devices and security servers than are shown in this example.

Security servers 12(1)-12(2) and network devices 14(1)-14(5) are interconnected by logical and/or physical links. For example, in one embodiment, network device 14(2) is coupled to security server 12(1) by a physical Ethernet link, while network device 14(1) is coupled to network device 14(2) by a logical tunnel.

Network devices 14(1)-14(5) can each be one of various types of network devices, including routers, bridges, gateways, switches, and the like. Some network devices (e.g., such as network devices 14(1) and 14(5)) can also be end devices or client devices (e.g., such as personal computers). Some network devices like 14(1)-14(5) can also be configured to operate as security servers 12(1) and 12(2). Alternatively, security servers can be implemented on host computing devices.

In this example, security servers 12(1) and 12(2) are AAA (Authentication, Authorization, and Accounting) servers. Security servers 12(1) and 12(2) perform authentication using a link authentication protocol (e.g., an Extensible Authentication Protocol (EAP) method over IEEE 802.1X). Security servers 12(1) and 12(2) also perform authorization using a protocol such as RADIUS (Remote Authentication Dial In User Service), Diameter (a protocol proposed as a successor to RADIUS), or TACACS (Terminal Access Controller Access Control System).

In general, a security server is a network component that acts as a server in some sort of security exchange, such as an authentication exchange or an authorization exchange. A security exchange is an exchange of communications between a network device and the security server according to a security protocol. The security exchange operates to verify and/or initialize security features of the network device. A security exchange can perform authentication, which is the process of identifying and verifying a user, and/or authorization, which determines what an authenticated user can do (e.g., the types of packets that a user can send) within the network. During authorization, various security features can be enabled or disabled, depending on the type of traffic that a user is allowed to generate and send within the network.

Security servers 12(1) and 12(2) each include a user interface via which a user can manually provide server contact information to the security servers. For example, each security server 12(1) and 12(2) can include a Command Line Interface (CLI) that allows a network administrator to enter contact information (e.g., network address and port identifier) for each of one or more security servers.

In the example of FIG. 1, creation of the secured network fabric begins with a security server and propagates outwards as every network device is secured by the security server and in turn provides admission control (e.g., by acting as a proxy or facilitating communication with the security server) to "downstream" neighbors. As part of each authentication and/or authorization exchange with a network device, the security server returns security server contact information to the network device. If there is only one security server in the network, the security server returns its own contact information to the network device. If there are multiple servers in the network, the security server can return a list of all the servers and their respective contact information.

Server contact information typically does not change very often. When server contact information is changed, however, all of the network devices need to be updated with the new server contact information. If each network device routinely (i.e., in a routine manner, such as periodically or in response to certain conditions) performs security exchanges, the network devices will receive the new server contact information the next time a security exchange is performed. For example, if authentication and authorization are performed periodically, each network device receives the latest server contact information, without any manual intervention, when the server list is returned by the server at the end of each periodic re-authentication and re-authorization cycle. Alternatively, instead of waiting for the next routine security exchange with each device, the security server can send the updated security server contact information to each network device as soon as a modification to the security server contact information is detected.

It is noted that for simplicity, much of this description describes a network device as being secured in response to simply completing a security exchange (or a set of security exchanges) with a security server. In many situations, however, a network device will actually become secured on an interface-by-interface or link-by-link basis. For example, network device 14(2) can participate in a security exchange with security server 12(1), securing the interface of network device 14(2) that is facing security server 12(1) and/or the link coupling security server 12(1) to network device 14(2). The interfaces of network device 14(2) that face network devices 14(1), 14(3), and 14(4) are not secured, however, until network device 14(2) conducts security exchanges with a security server for those interfaces. For example, network device can later send a RADIUS request to security server 12(1) to obtain policy information to apply to each of those interfaces. Thus, a network device can be secured with respect to one of the network device's interfaces, while being unsecured with respect to a different one of the network device's interfaces. Accordingly, a secured network device is a network device that has completed a security exchange via at least one of the network device's interfaces, and that network device is only "secured" with respect to the secured interface(s).

Additionally, some network devices may never become secured. For example, network device 14(5) can belong to a different organization than network devices 14(1)-14(4) and security servers 12(1) and 12(2). Accordingly, network device 14(5) may not include credentials necessary to participate in security exchanges with security servers 12(1) and 12(2).

It is noted that the above-described techniques for dynamically disseminating security server contact information do not preclude the use of the conventional methods (e.g., such as manual configuration or DNS SRV record) of obtaining security server contact information. Thus, a given network can include some devices that are configured to obtain security server contact information both dynamically via security exchanges as well as via DNS requests. For example, network device 14(1) can be configured to request security server contact information via DNS requests. If network device 14(1) is unable to contact a DNS server (e.g., because network device 14(1) does not yet have IP connectivity with a DNS server), network device 14(1) can nevertheless obtain security server contact information during security exchanges (e.g., with security server 12(1)).

Also, a given network can include both devices on which security server contact information has been manually configured and network devices that dynamically receive security server contact information. All or some of the network devices that have manually configured security server contact information can be configured to update and/or replace the manually configured security server contact information based on information received during security exchanges. For example, network device 14(3) can be manually configured with security server contact information for security server 12(2). While participating in a security exchange with security server 12(2), network device 14(3) receives from security server 12(2) security server contact information for both security servers 12(1) and 12(2). In response to receiving this information, network device 14(3) can update its security server contact information to include the security server contact information for security server 12(1).

Figure 2:
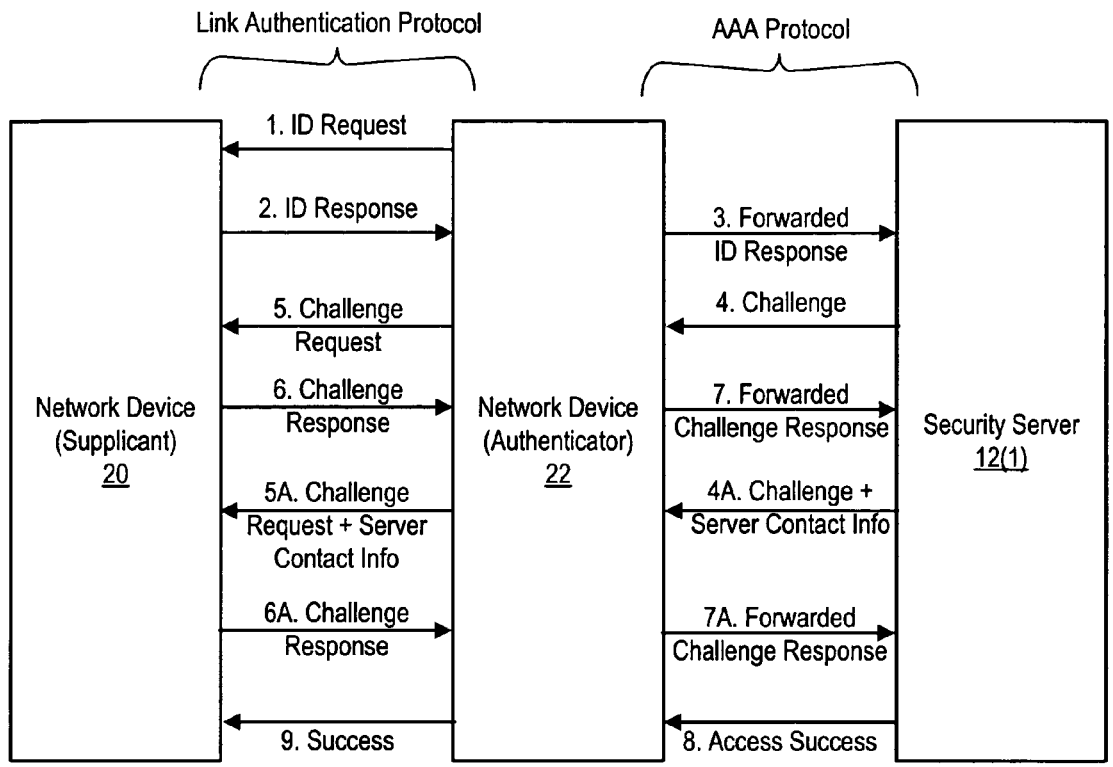
FIG. 2 is a block diagram of a network that includes two network devices that are participating in a link authentication protocol exchange with an authentication server, according to one embodiment of the present invention.

Furthermore, in some embodiments, network devices other than security servers can send security server contact information to other network devices. For example, a network device acting as an authenticator can send security server contact information to a network device acting as a supplicant during an authentication exchange. FIG. 2 shows an example authentication exchange in more detail.

FIG. 2 shows an example of a link authentication protocol exchange involving network device 20, network device 22, and security server 12(1). In this example, network device 22 has already been authenticated and is acting as an authenticator (referred to as authenticator 22). Network device 20 is attempting to become authenticated within the network, and is acting as a supplicant (referred to as supplicant 20).

According to some link authentication protocols, an interface (e.g., a port) of a network device begins operation in an unauthenticated state. While in the unauthenticated state, the interface can only send and receive communications (e.g., packets or frames) that are being sent according to the link authentication protocol (i.e., other communications are not allowed in this state). In the unauthenticated state, the interface uses the link authentication protocol to authenticate the peer interface to which the interface is coupled, acquire policy to be used to control communications sent to and/or received from the peer interface and/or received via the link from the authentication server, and/or establish a security association between the interface and the peer interface. After the authentication completes, the interface operates in an authenticated state. When the interface is in the authenticated state, the network device can use the interface to send and receive communications. A link is considered to be authenticated when both interfaces (e.g., ports) coupled to each endpoint of that link are authenticated via a link authentication protocol exchange.

FIG. 2 illustrates an example of a situation in which IEEE 802.1X is used as the link authentication protocol. Each link authentication protocol exchange involves several actions. First, authenticator 22 sends (1) a packet (referred to herein as an "ID Request") requesting identification information to supplicant 20. Authenticator 22 sends the ID Request in response to detecting that the link between authenticator 22 and supplicant 20 is active.

In response to the ID Request, supplicant 20 sends (2) a packet (referred to as an "ID Response") containing identification information to authenticator 22. The ID Response can include identification information configured on the supplicant for use with the link authentication protocol (e.g., such information can uniquely identify supplicant 20 and/or the interface of supplicant 20 coupled to authenticator 22 via the link being authenticated). Authenticator 22 then forwards (3) this information to authentication server 24. Authenticator 22 can communicate with authentication server 24 using an AAA (Authentication, Authorization, and Accounting) protocol such as RADIUS (Remote Authentication Dial-In User Service). Thus, authenticator 22 can encode the IEEE 802.1X data received from supplicant 20 within a RADIUS packet.

In response to receiving the information identifying supplicant 20 from authenticator 22, authentication server 24 sends (4) authenticator 22 a challenge (e.g., such as that used in a token password system) to be sent to supplicant 20. This challenge can, for example, include a request for the secret associated with the identity of supplicant 20. Authenticator 22 extracts a link authentication protocol packet (referred to herein as "Challenge Request") from the AAA protocol "Challenge" packet and then sends (5) the link authentication protocol "Challenge Request" packet to supplicant 20.

Supplicant 20 sends (6) a response to the Challenge Request to authenticator 22 via another link authentication protocol packet (referred to herein as "Challenge Response"). This response can include the secret configured on the supplicant for use in the link authentication protocol. Authenticator 22 in turn encodes the Challenge Response in an AAA protocol packet in order to forward (7) the supplicant's response to authentication server 24.

In some embodiments, such as the one illustrated in FIG. 2, there are several iterations of challenges and responses. Thus, if supplicant 20 returns appropriate credentials to the security server in the first iteration of challenges and responses (at (4), (5), (6), and (7)), the security server sends a second challenge to the supplicant via the authenticator, as shown at (4A) and (5A). The supplicant then sends a second set of responses, as shown at (6A) and (7A) to the security server. This process can continue for as many iterations as needed to fully authenticate the supplicant. In FIG. 2, only two iterations are illustrated. It is noted that other embodiments may only perform a single iteration of challenges and response.

If the supplicant 20 has the appropriate credentials, a secure logical tunnel can be established between the supplicant 20 and authentication server 24. The logical tunnel can established by encrypting link authentication protocol packets sent between supplicant 20 and authentication server 24 in a way that is dependent upon the credentials (e.g., the secret configured on the supplicant) provided by the supplicant. For example, the credential(s) provided by the supplicant 20 in the first challenge and response iteration can be used to select the type of encryption to be used for subsequent messages sent between supplicant 20 and authentication server 24.

A challenge message (e.g., the Challenge and Challenge request messages shown at (4A) and (5A)) can also include server contact information. The server contact information is included in the body of the Challenge message. In one embodiment, the server contact information is included in a TLV (Type, Length, Value) element in the body of the Challenge message. The value of the type field can identify that the TLV is being used to convey security server contact information, the value of the length field can identify the length of the TLV, and the value of the value field includes server contact information for one or more security servers. The server contact information includes contact information (e.g., a port and network address) for one or more security servers. For example, the contact information can include the port and network address of authentication server 24. In one embodiment, the server contact information is included in the challenge message that is sent during the final iteration of challenges and responses (e.g., the second iteration in FIG. 2).

Since the security server contact information is conveyed in the body of the challenge message, the security server contact information is secured by the same security mechanisms that protect the other messages in the authentication exchange. In IEEE 802.1X authentication exchanges, the challenge message is protected by the logical tunnel established between supplicant 20 and authentication server 24.

If the supplicant's responses indicate that supplicant 20 has the appropriate credentials, authentication server 24 sends (8) an Access Success message to authenticator 22 using the AAA protocol. Authenticator 22 extracts the link authentication protocol packet (referred to as the "Success" message) from the Access Success message and uses the link authentication protocol to forward (9) the Success message to supplicant 20. In response to each receiving a Success message, supplicant 20 and authenticator 22 enable communication on the link via which the link authentication protocol exchange was conducted. Communication via the link can be restricted based on information contained in the Success message (or a previously message, such as the most-recently sent Challenge message) received from authentication server 24.

In addition to receiving security server contact information during the authentication exchange, supplicant 20 also receives information identifying authenticator 22. Authenticator 22 similarly receives information identifying supplicant 20. Once each network device is in possession of the identity of its neighbor, authenticator 22 and supplicant 20 can send additional authorization requests to the security server 12(1) in order to acquire policy to be applied on the link coupling the supplicant and the authenticator.

Thus, once the authentication exchange illustrated in FIG. 2 has completed, authenticator 22 and supplicant 20 can each initiate an authorization exchange with security server 12(1) in order to obtain policy information for the link between authenticator 22 and supplicant 20. Authenticator 22 can request policy information that identifies the security policies to be applied to traffic received from supplicant 20, and supplicant 20 can request policy information that identifies the security policies to be applied to traffic received from authenticator 22. During each authorization exchange, each network device can also receive server contact information from security server 12(1), in addition to receiving policy information. For example, the security server 12(1) can return a RADIUS response to each client at the end of the authorization exchange. The body of the response can include both policy information and security server contact information.

While the example of FIG. 2 shows a situation in which the server contact information is sent to supplicant 20 in a Challenge message, it is noted that the server contact information can be sent to supplicant 20 in non-Challenge messages that are sent as part of the authentication exchange. For example, in some embodiments, the security server can return the server contact information to the supplicant in a Success message.

It is noted that in certain situations (e.g., such as the revocation or expiration of the shared secret on the supplicant or the failure of the security server with which the network device is communicating), a network device that has already been authenticated and/or authorized may effectively become unauthenticated and/or unauthorized. In such a situation, the network device will simply begin the authentication and/or authorization process, as described above, again.

While FIG. 2 illustrates a link authentication exchange, it is noted that security server contact information can also be propagated in other security exchanges. For example, as noted above, each network device can also receive security server contact information during an authorization exchange (e.g., conducted using an AAA protocol such as the RADIUS protocol). An authorization exchange can involve the network device acting as an authorization client by sending an authorization request to the authorization server, followed by the authorization server sending an authorization response to the client. The authorization server can include the security server contact information in the authorization response.

FIG. 2 shows an example authentication exchange in which the authenticator is not the same device as the authentication server. As noted above, in some situations, the authentication server itself can act as an authenticator. When a security server is able to act as an authenticator, other network devices (including other security servers) can dynamically receive server contact information from that security server when acting as supplicants during authentication exchanges.

In some embodiments, however, a security server can act as an authorization and authentication server but cannot also act as an authenticator. In these situations, the network device(s) closest to the security server will not be able to dynamically receive server contact information from the security server during an authentication exchange. This situation arises because there is no device that can act as an authenticator for the network device closest to the security server, thus preventing the network device from being able to act as a supplicant during an authentication exchange. To allow this network device closest to the security server to be able to contact the security server in such a situation, the network device can be manually configured with security server contact information for the security server. For example, the closest network device can be manually configured with the port and network address of the security server. The network device can then use the manually configured information to perform the first authorization exchange with the security server. During the authorization exchange, the security server can provide a complete server list (e.g., if there is more than one security server in the network, and contact information for only one security server is provided in the manually configured contact information) to the network device, or provide updated server contact information to the network device. The network device can update, replace, or supplement the manually configured information with the information provided during the authorization exchange.

Once the network device closest to the security server has performed the first authorization exchange with the security server, that network device will be able to act as an authenticator in authentication exchanges. Thus, other network devices that are coupled to the security server via the authorized network device will be able to act as supplicants, and consequentially these network devices will dynamically receive the server contact information during authentication and/or authorization exchanges.

Figure 3:
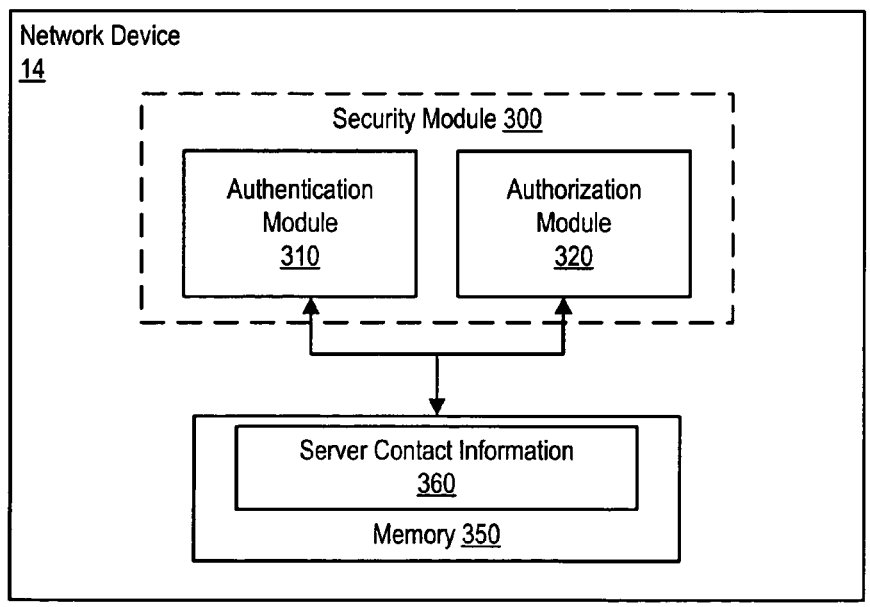
FIG. 3 is a block diagram illustrating security functionality within a network device, according to one embodiment of the present invention.

FIG. 3 is a block diagram of a network device 14 (e.g., any one of network devices 14(1)-14(5) of FIG. 1) that is configured to receive security server contact information from a security server as part of security exchange. As shown, network device 14 includes a security module 300, which includes an authentication module 310 and an authorization module 320. Security module 300 is coupled to a memory device 350 (e.g., one or more registers, random access memory devices, flash memory devices, or the like), which stores server contact information 360.

Security module 300 is configured to participate in one or more different types of security exchanges with a security server. In the illustrated example, security module 300 is configured to participate in both authentication exchanges (using the functionality provided by authentication module 310) and authorization exchanges (using the functionality provided by authorization module 320).

Authentication module 310 supports an authentication protocol, allowing authentication module 310 to participate in authentication exchanges. When authentication module 310 participates in an authentication exchange (e.g., acting as a supplicant in an IEEE 802.1X exchange, as described above with respect to FIG. 2), authentication module 310 can receive an authentication protocol packet that includes server contact information for one or more security servers. In response to receiving the authentication protocol packet, authentication module 310 detects the presence of the server contact information (e.g., in response to the presence of a particular TLV within the packet), extracts the server contact information from the packet, and stores the server contact information in memory 350. Authentication module 310 can then use the server contact information (e.g., when acting as an authenticator) when sending packets to a security server in a later authentication exchange.

Authorization module 320 supports an authorization protocol (e.g., such as RADIUS), allowing authorization module 320 to participate in authorization exchanges. Authorization module 320 can receive server contact information in authorization protocol packets received as part of authorization exchanges. In response to receiving such a packet, authorization module 320 detects the presence of the server contact information within the packet, extracts the server contact information, and stores the server contact information in memory 350. Like authentication module 310, authorization module 320 can then use server contact information 360 in memory 350 when sending packets to a security server in a later authorization exchange.

It is noted that authentication module 310 and authorization module 320 accesses the same server contact information 360 (as an alternative, each module can maintain its own private set of server contact information). Additionally, if one module receives updated contact information, that module can overwrite and/or update server contact information 360 that was stored by the other module. For example, during an initial authentication exchange, authentication module 310 can receive server contact information for a single security server. Authentication module 310 can store that contact information as server contact information 360 in memory 350. Authorization module 320 can subsequently use that server contact information to provide the destination port and address for an authorization protocol packet containing an authorization request. When authorization module 320 receives a response to the authorization request, the response may include server contact information for several security servers. Authorization module 320 can use this information to supplement and/or replace the server contact information already stored in memory 350.

If server contact information 360 includes contact information for more than one security server as well as priority information, authentication module 310 and authorization module 320 can use the priority information when selecting which of the security servers to contact. For example, if server contact information 360 includes contact information for three security servers A, B, and C, and priority information that identifies A as having the highest priority, authorization module 320 will first send an authorization request to security server A. If security server A does not respond, authorization module 320 can then attempt to contact the security server (e.g., security server B) with the next-highest priority.

FIG. 3 shows an example of a network device. It is noted that a security server (e.g., security servers 12(1)-12(2) of FIG. 1) can be similarly configured. For example, a security server can include a security module (e.g., implemented in hardware and/or software) that is configured to participate in security exchanges with clients and/or supplicants. The security module included in the security server is configured to distribute server contact information to a network device during security exchanges with that network device. The security server can also include a memory device for storing the server contact information and a user interface for allowing users to create, modify, and delete the server contact information.

Figure 4:
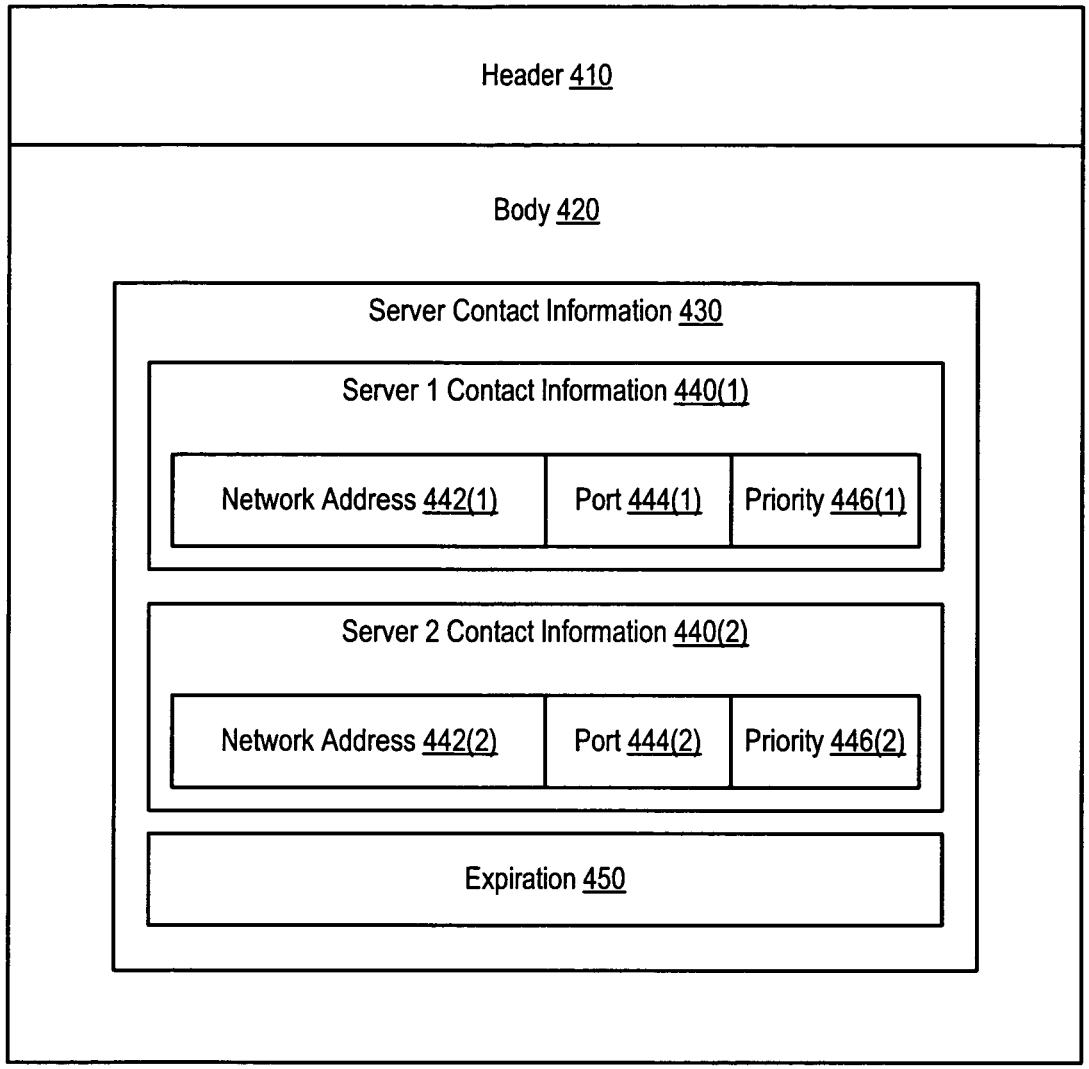
FIG. 4 is an illustration of a packet that includes server contact information, according to one embodiment of the present invention.

FIG. 4 illustrates an example of a security protocol packet 400 that includes server contact information. Security protocol packet 400 is an example of a packet that is formatted and conveyed according to a security protocol, such as an authentication or authorization protocol.

Security protocol packet 400 includes a header 410 and a body 420. Header 410 includes overhead information that is used to forward and route the packet from the packet's source to the packet's destination. Header 410 can include, among other information, a source address and a destination address.

Body 420 includes the information being conveyed from the packet's source to the packet's destination. Body 420 can include various information that is being conveyed according to a security protocol. Body 420 also includes server contact information 430. Server contact information 430 includes contact information for one or more security servers. It is noted that one or more of the network address(es) included in server contact information may be the same as network addresses included in other parts of security protocol packet 400 (e.g., if packet 400 is being sent from a security server that is also listed in server contact information 430, the packet's source address in header 410 may be the same as one of the network addresses in server contact information 430).

In the illustrated example, server contact information includes contact information 440(1) and 440(2) for two security servers, Server 1 and Server 2. Contact information 440(1) corresponds to Server 1. Contact information 440(1) includes a network address 442(1), a port identifier 444(1), and a priority 446(1). Similarly, contact information 440(2) corresponds to Server 2 and includes network address 442(2), port identifier 444(2), and priority 446(2). It is noted that some embodiments do not include port identifiers and/or priority information, and that other server contact information can be included instead of and/or in addition to the information shown in FIG. 4.

Network addresses 442(1) and 442(2) are the network addresses of Server 1 and Server 2 respectively. Network addresses 442(1) and 442(2) can include various network addresses, such as Ethernet addresses, Internet Protocol addresses, and the like. Port identifiers 444(1) and 444(2) identify the ports (e.g., the User Datagram Protocol (UDP) port) via which the security servers receive communications.

Priority information 446(1) and 446(2) identify the priorities of Server 1 and Server 2 respectively. The network device that receives security protocol packet 400 will determine which security server (of Server 1 and Server 2) to contact based on the priority information associated with each server. When the security server sends security protocol packet 400 to the network device, the security server can identify which security server(s) should be the highest priority for that particular network device. The security server's determination can be based on preconfigured priorities or based on information such as the distance (e.g., in network hops) of each security server from that network device. The security server can, for example, assign higher priorities to security servers that are closer to the particular network device and lower priorities to security servers that are located further away from the particular network device. Alternatively, the security server can assign priorities in order to distribute load among the security servers. For example, in a network configuration in which a branch office connects to a central office, the network devices in the branch office receive a server list that includes the security servers in both the branch office and central office. However, the security servers in the branch office are given higher priority over the security servers in the central office in the server lists that are provided to the network devices in the branch office. Similarly, the network devices in the central office can receive server lists that include security servers in both the central office and in one or more branch offices; however, the security servers in the central office will be assigned higher priority. As this example shows, different network devices can receive the same list of security servers, but with different priorities assigned to the security servers within the list.

Server contact information 430 also includes expiration information 450. Expiration information 450 identifies the time during which server contact information 430 will be valid. For example, expiration information 450 can identify a particular point in time (e.g., 4:30 PM). After that time, server contact information 430 will no longer be valid. Alternatively, expiration information 450 can identify a length of time (e.g., eight hours). After the length of time has passed, server contact information 430 will no longer be valid.

It is noted that the security server can include different types and/or amounts of information in different types of security protocol packets. In one embodiment, a security server includes contact information for a single security server in authentication protocol packets. For example, the security server currently participating in the authentication exchange can include its network address and port identifier in an authentication protocol packet sent to the supplicant network device. In a later authorization exchange with the same network device, the security server can return a server list that includes contact information for several security servers. This can be used to give priority to the security server that is known to be operating and reachable before the authorization exchange is complete, while also providing an option to failover to other servers, if necessary, after the authorization exchange completes.

Additionally, it is noted that the information included in server contact information 430 can vary temporally. For example, at T1, a security server can send a security protocol packet that identifies three security servers S1, S2, and S3, with respective priorities of 1, 2, and 3 (with a priority of 1 being the highest) to a network device. The security server assigned the highest priority to S1 due to S1 being the closest security server to the network device. Due to changes in the network configuration (e.g., such as the relocation of the network device or changes in network interconnections), the network device is closer to S2 than to S1 at a later time T2. Accordingly, in security protocol packets sent to the network device subsequent to T2, S2 can be assigned the highest priority. Similarly, if security servers are added or removed, server contact information 430 can be updated appropriately.

It is noted that security protocol packet 400 can include additional information in the server list such as credentials, revocation information, server list names, and scope information. Credentials can include information that the security server uses to identify itself to a network device and/or to indicate the status of the security server's relationship with the network device to which the server list is being sent. For example, a server list can include a credential for a particular security server that indicates whether the network device needs to obtain a security credential from the server. The network device can, for example, determine whether the network device already has a shared secret associated with that particular credential. If the network device does not have a shared secret that is associated with the particular credential provided in the server list, the network device will need to obtain a shared secret from the security server.

Revocation information can include information identifying credentials or policies that the security server is revoking. Server list names include information that a network device uses to determine whether the network device has the most up-to-date server list. When a network device performs a new authorization exchange, for example, the network device receives a server list name and a generation number from the security server. If the network device's current server list name and generation number doesn't match that sent by the security server, the network device initiates a follow-up authorization exchange to obtain the new server list.

Scope information identifies the scope of a particular server list. For example, different security servers can distribute different server lists. As a result, network devices can receive different server lists depending on the security server that each network device contacts. For example, each department (Human Resources, Engineering, and Marketing) can operate a pair of redundant security servers, and these security servers will each distribute department-specific server lists. If a network device is on the boundary between two departments (e.g., a network device that couples the Human Resources department to the Engineering department), that network device may receive two different server lists (e.g., one listing security servers in Human Resources, and one listing security servers in Engineering). In that situation, the network device can be configured to prioritize one server list over the other, and the network device can use the scope information included in each server list to differentiate between the lists.

In some embodiments, server lists are secured by public key cryptography. In such embodiments, a public key infrastructure (PKI) is implemented throughout the network. Each server list is digitally signed by an entity (e.g., the security server) that is authorized by the PKI to do so. Network devices can then verify the origin and integrity of each received server list based on the digital signature included in each server list. In one embodiment, verification is done by assigning a X.509 certificate, signed by a certificate authority of the deployed PKI, to the entity (e.g., the security server) that has been designated to sign server lists. The X.509 certificate identifies that the entity is allowed to sign server lists. Each network device, using a provisioned trust anchor that allows for verification of digital signatures within the PKI, can then verify the origin authentication and integrity of each received server list.

Figure 5:
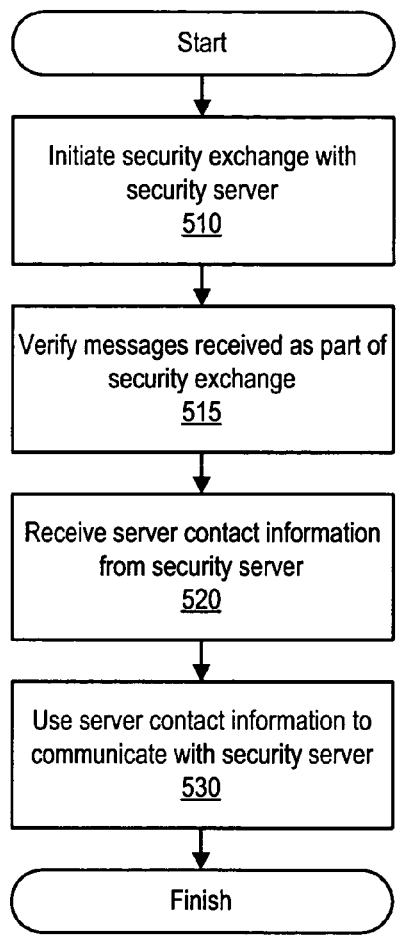
FIG. 5 is a flowchart of a method performed by a network device, according to one embodiment of the present invention.

FIG. 5 illustrates a method of dynamically providing security server contact information to a network device. At 510, a network device initiates a security exchange with a security server. In general, a security exchange is an exchange of two or more packets between the network device and the security server (this exchange may also involve a proxy network device interposed between the network device and the security server) in order to perform either authentication or authorization. Thus, the security exchange can be an authentication exchange or an authorization exchange. The network device can initiate an authentication exchange by initiating contact with an authenticator device (which may be the security server, if the security server is directly coupled to the network device by the link being authenticated and if the security server is configured to act as an authenticator). The authenticator device can then communicate with the security server on behalf of the network device. The network device can initiate an authorization exchange by sending an authorization request to the security server.

During the security exchange the network device verifies the origin and integrity of each message received within the context of the security exchange with the security server, as shown at 515. In one embodiment, verification is performed using a secure tunnel protocol, such as EAP-FAST (defined in Request for Comments 2716; EAP-FAST (Extensible Authentication Protocol—Flexible Authentication via Secure Tunneling) can be used to perform IEEE 802.1X exchanges) between the network device and the security server. In other embodiments, verification is performed using a system such as PKI.

During the security exchange, the network device receives security server contact information from the security server, as shown at 520. The network device receives the security server contact information in the body (as opposed to the header) of a security protocol packet. The security server contact information includes contact information for one or more security servers. The security server contact information can include contact information for the security server that is participating in the security exchange.

The network device then uses the security server contact information to communicate with a security server, as shown at 530. The network device can, for example, use security server contact information when acting as an authenticator in a subsequent authentication exchange or when acting as a supplicant in a subsequent authorization exchange. The network device can use the security server contact information by selecting a security server (e.g., based on priority information included in the security server contact information) and sending a security protocol packet to that security server using addressing information included in the security server contact information.

It is noted that the method of FIG. 5 can be performed without using services such as DNS SRV record. In other words, a network device can obtain security server contact information dynamically without generating a DNS request for that information (it is also noted that a DNS exchange is not a security exchange). Additionally, the network device can dynamically receive security server contact information without necessarily having IP connectivity to any security servers or other servers (such as DNS servers). For example, the network device can dynamically receive security server contact information during an authentication exchange conducted via an authenticator, before the network device has obtained IP connectivity to the security server that is participating in the authentication exchange.

Figure 6:
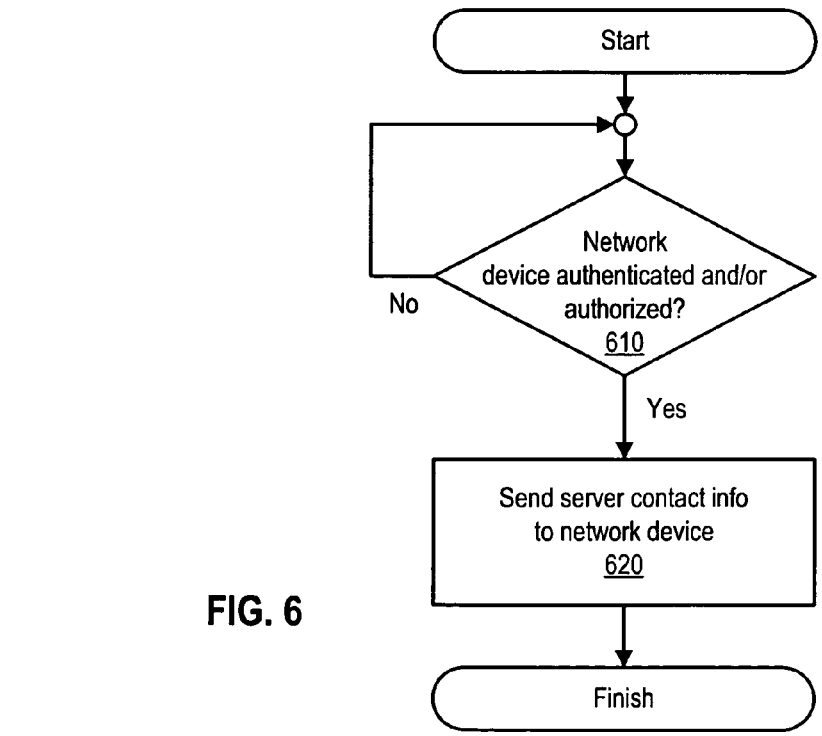
FIG. 6 is a flowchart showing an example of a method performed by a security server, according to one embodiment of the present invention.

FIG. 6 illustrates a method of determining whether to dynamically provide security server contact information to a network device. This method can be performed, for example, by a security server that is configured to dynamically distribute security server contact information to network devices.

At 610, the security server determines whether the network device has been authenticated and/or authorized within the network. For example, the security server can make the determination as to whether a network device should be authenticated during an authentication exchange., If the network device has provided the proper credentials to the security server, the security server can determine that the network device should be authenticated and will send a Success message (or subsequent Challenge messages) to the network device. Similarly, if the network device has initiated an authorization exchange in order to obtain policy information to apply to a peer, the security server can determine whether the network device is authorized to receive that policy information. If the network device has provided the proper credentials, the security server can determine that the network device is authorized to receive the policy information.

If the network device is authenticated and/or authorized, the security server sends security server contact information to the network device, as shown at 620. This security server contact information is provided to the network device as part of a security exchange (e.g., as an additional TLV or field within a security protocol packet being sent from the security server to the network device).

Figure 7:
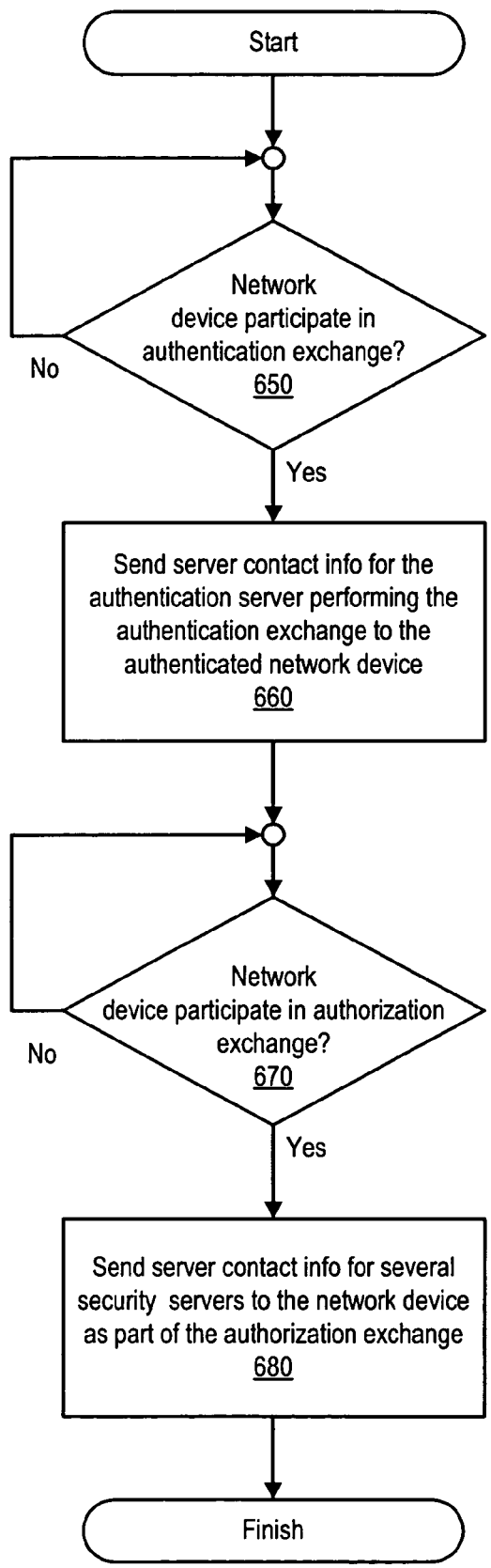
FIG. 7 is a flowchart of another example of a method performed by a security server, according to one embodiment of the present invention.

FIG. 7 is a flowchart of another example of a method that can be performed by one or more security servers. In this example, if a network device has successfully participated in an authentication exchange (e.g., by exchanging one or more pairs of challenges and responses with the security server), as determined at 650, the security server sends a server list containing contact information for a single security server to the network device. This server list can be sent, for example, in a challenge message sent by the security server during the authentication exchange. As shown at 660, this server list includes security server contact information for the security server that acted as authentication server in the authentication exchange with the network device.

If the network device subsequently successfully participates in an authorization exchange, as detected at 670, the security server can send the network device a more complete server list, which includes contact information for several security servers, as shown at 680. This server list can be included, for example, in an authorization response message sent by the security server at the end of the authorization exchange.

EXAMPLES OF A NETWORK DEVICE

Figure 8:
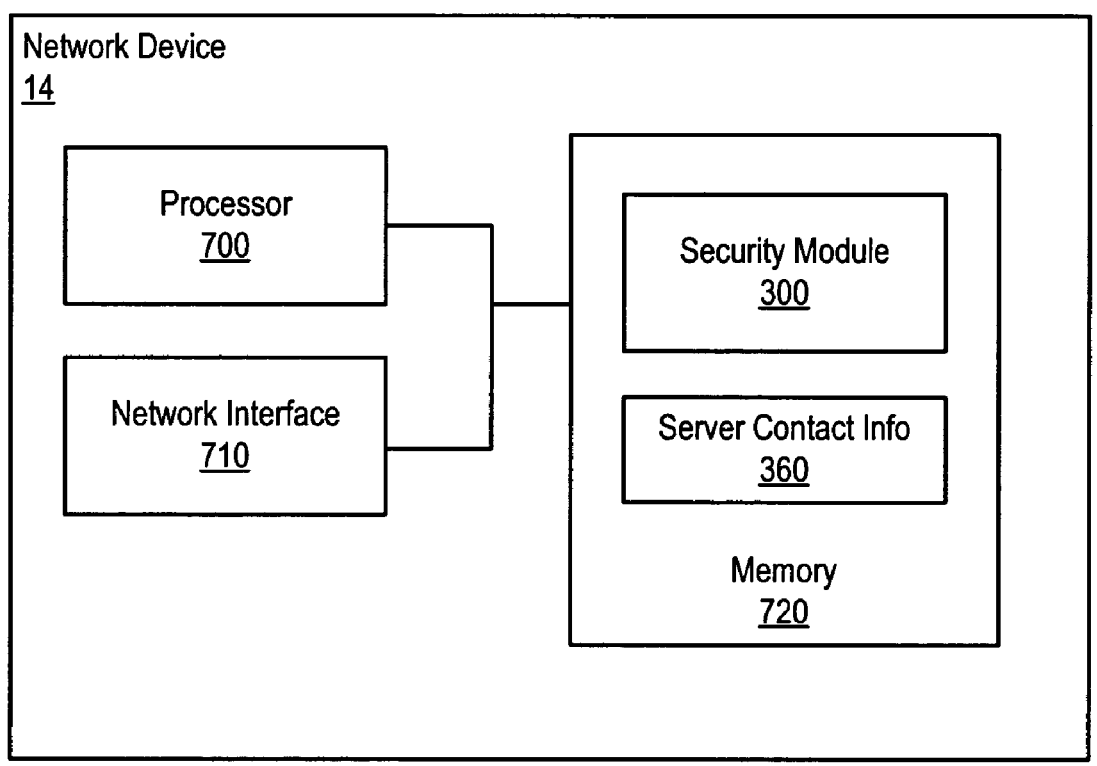
FIG. 8 is a block diagram of a network device, according to one embodiment of the present invention.

FIG. 8 illustrates a block diagram of a network device 14 (e.g., one of network devices 14(1)-14(5) of FIG. 1), illustrating how security module 300 can be implemented in software. As illustrated, network device includes one or more processors 700 (e.g., microprocessors, PLDs (Programmable Logic Devices), or ASICs (Application Specific Integrated Circuits)) configured to execute program instructions stored in memory 720. Memory 720 can include various types of RAM (Random Access Memory), ROM (Read Only Memory), Flash memory, MEMS (Micro Electro-Mechanical Systems) memory, and the like. Network device 14 also includes one or more interfaces 710 (e.g., one or more hardware ports or other network interfaces that can be linked to other network devices, hosts, servers, or the like). Processor 700, interface 710, and memory 720 are coupled to send and receive data and control signals by one or more buses or other interconnects.

In this example, program instructions executable to implement security module 300 are stored in memory 720. Security module 300 is an example of a security module means. A copy of all or part of security server contact information 360 can also be stored in memory 720. Memory 70 is an example of a computer readable storage means.

It is noted that the program instructions executable to implement security module 300 can be stored on various computer readable media that are also storage media, such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, a computer readable medium is a carrier medium such as a network and/or a wireless link upon which signals such as electrical, electromagnetic, or digital signals, on which the data and/or instructions implementing the authentication module, supplicant module, and/or role determination module are conveyed.

Figure 9:
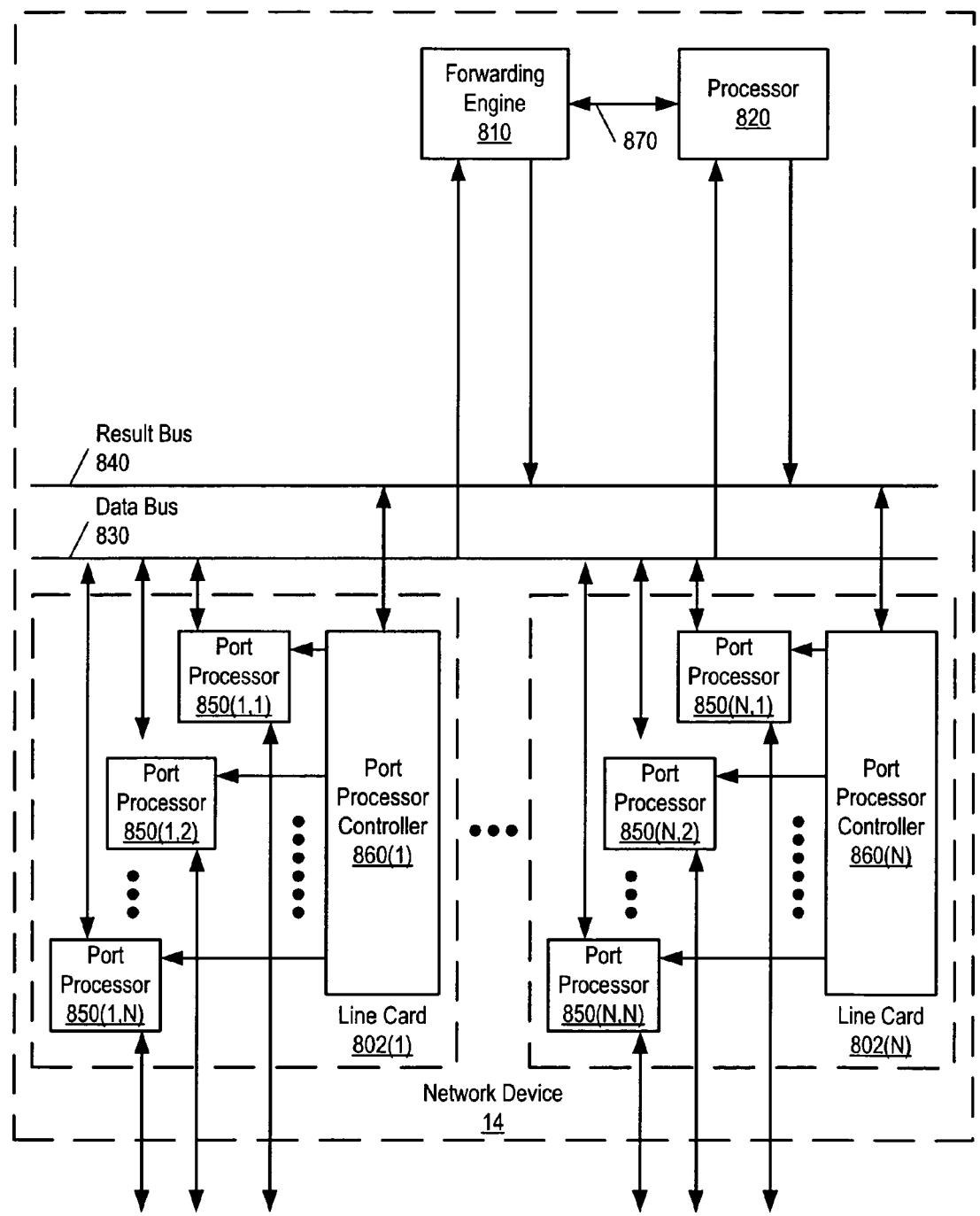
FIG. 9 is another block diagram of a network device.

FIG. 9 is a block diagram illustrating a network device. In this depiction, network device 14 (e.g., one of network devices 14(1)-14(5) of FIG. 1) includes a number of line cards (line cards 802(1)-802(N)) that are communicatively coupled to a forwarding engine 810 and a processor 820 via a data bus 830 and a result bus 840. Line cards 802(1)-(N) include a number of port processors 850(1,1)-850(N,N) which are controlled by port processor controllers 860(1)-860(N). It will also be noted that forwarding engine 810 and processor 820 are not only coupled to one another via data bus 830 and result bus 840, but are also communicatively coupled to one another by a communications link 870. It is noted that in alternative embodiments, each line card can include a forwarding engine.

When a packet is received, the packet is identified and analyzed by a network device such as network device 800 in the following manner, according to embodiments of the present invention. Upon receipt, a packet (or some or all of its control information) is sent from one of the port processors 850(1,1)-850(N,N) at which the packet was received to one or more of those devices coupled to data bus 830 (e.g., others of port processors 850(1,1)-850(N,N), forwarding engine 810 and/or processor 820). Handling of the packet can be determined, for example, by forwarding engine 810. For example, forwarding engine 810 may determine that the packet should be forwarded to one or more of port processors 850(1,1)-850(N,N). This can be accomplished by indicating to corresponding one(s) of port processor controllers 860(1)-860(N) that the copy of the packet held in the given one(s) of port processors 850(1,1)-850(N,N) should be forwarded to the appropriate one of port processors 850(1,1)-850(N,N).

Network device 14 can implement one or more security modules (e.g., in port processor controllers 860(1)-860(N) and/or in processor 820) that are configured to dynamically receive security server contact information as described above. For example, each of port processor controllers 860(1)-860(N) can include a security module 300, as shown in FIG. 3. When a packet is received as part of a security exchange via, for example, port processor 850(1,1), a security module in port processor controller 860(1) can determine whether the packet includes security server contact information. If so, port processor controller 860(1) can extract and store the included security server contact information. When initiating a subsequent security exchange, port processor controller 860(1) can use the stored security server contact information to address a packet to a security server.

Although the present invention has been described with respect to specific embodiments thereof, various changes and modifications may be suggested to one skilled in the art. It is intended such changes and modifications fall within the scope of the appended claims.

What is claimed is:

1. A method comprising:
   receiving a server list as part of a first security exchange, wherein
      the server list is received by a first network device,
      the first network device acts as a supplicant in the first security exchange,
      the server list comprises network addresses of two or more security servers, including a first network address of a first security server and a second network address of a second security server, and the server list identifies the first security server as having a higher priority than the second security server; and
communicating with the first security server of the two or more security servers as part of a second security exchange, using information in the server list, wherein
the first network device acts as an authenticator to a second network device in the second security exchange,
the communicating comprises sending a packet to the first network address of the first security server, and
the communicating is performed by the first network device; and
sending the server list during the second security exchange, wherein the first network device performs the sending to the second network device.

2. The method of claim 1,
wherein the first security sever is an authorization server.

3. The method of claim 2, further comprising:
in response to detecting an inability to communicate with the authorization server, communicating with the second security server by sending a second packet to the second network address, wherein the second security sever is a second authorization server.

4. The method of claim 1, further comprising:
providing the server list to an additional network device.

5. The method of claim 1, further comprising:
verifying the server list, wherein
the verifying is dependent upon a public key infrastructure.

6. A method comprising:
determining that a first network device is a secure network device as part of a
security exchange, wherein
the determining is performed in response to the first network device providing proper credentials to a first security server, and
the first security server performs the determining while participating in the security exchange;
sending a server list to the first network device during the security exchange, in response to the determining, wherein
the security server performs the sending,
the server list comprises network addresses of two or more security servers, including a first network address of the first security server and a second network address of a second security server, and
the server list identifies the first security server as having a higher priority than the second security server; and
participating in a subsequent security exchange with a second network device, wherein
the first security server performs the participating, and
the first network device contacts the first security server during the subsequent security exchange using the first network address of the first security server in the server list.

7. The method of claim 6, wherein
the security exchange is an authentication exchange.

8. The method of claim 6, wherein
the security exchange is an authorization exchange.

9. The method of claim 6, wherein
the server list comprises expiration information.

10. The method of claim 6, further comprising:
resending the server list to the first network device in response to detecting that the server list has been modified.

11. A system comprising:
a network device comprising a security module and a memory device coupled to the security module, wherein
the security module is configured to participate as a supplicant in a security exchange,
the security module is configured to receive a server list during the security exchange,
the server list comprises network addresses of two or more security servers, including a first network address of a first security server and a second network address of a second security server,
the server list identifies the first security server as having a higher priority than the second security server, and
the security module is configured to store the server list in the memory device, and
the security module is configured to use the first network address of the first security server of the two or more security servers to contact the first security server during a subsequent security exchange, wherein
the security module is configured to act as an authenticator to a second network device in the subsequent security exchange, and
the security module is configured to send the server list to the second network device during the subsequent security exchange.

12. The system of claim 11, wherein
the security module comprises an authentication module, and
the authentication module is configured to receive the server list from one of the two or more security servers during an authentication exchange.

13. The system of claim 12, wherein
he security module comprises an authorization module,
the authorization module is configured to participate in an authorization exchange with an authorization server,
the authorization module is configured to receive a second server list from the authorization server as part of the authorization exchange,
the authorization module is configured to store the second server list in the memory device, and
the second server list comprises a plurality of network addresses, each network address corresponding to a respective one of a plurality of security servers.

14. The system of claim 13, wherein
the security module is configured to select a third network address of a third security server in response to the second server list identifying the third security server as having a highest priority of the security servers.

15. The system of claim 11, wherein
the security module is configured to verify that the server list is not expired by accessing expiration information, prior to using the network address to initiate the security exchange, and
the server list comprises the expiration information.

16. A system, comprising:
a first security server comprising a security module and a memory device coupled to the security module, wherein
the security module is configured to participate in a security exchange with a first network device,
the memory device is configured to store a server list, the server list comprising network addresses of two or more security servers, including a first network address of the first security server and a second network address of a second security server,
the server list identifies the first security server as having a higher priority than the second security server, and
the security module is configured to send the server list to the first network device, in response to detecting that the first network device is a secure network device, in response to the first network device providing proper credentials to the security module while participating in the security exchange, and the security module is configured to participate in a subsequent security exchange with a second network device, wherein the first network device is configured to contact the first security server during the subsequent security exchange using the first network address of the first security server in the server list.

17. The system of claim 16, wherein the first security server comprises:

a user interface, wherein the user interface is configured to receive user input specifying the server list, and the user interface is configured to store the server list in the memory device, in response to receiving the user input.

18. The system of claim 17, wherein he security module is configured to send a second server list to the first network device as part of an authorization exchange, and the second server list comprises a plurality of network addresses, wherein each of the network addresses corresponds to a respective one of a plurality of security servers.

19. The system of claim 17, wherein the security module is configured to resend the server list to the first network device in response to detecting that the server list has been modified.

20. A system comprising:

a first security server; and a first network device coupled to the first security server, wherein the first security server is configured to participate in a security exchange with the first network device, the first security server is configured to provide a server list to the first network device, in response to detecting that the first network device is a secure network device, in response to the first network device presenting proper credentials to the first security server while participating in the security exchange, the server list comprises addresses of two or more security servers, including a first network address of the first security server and a second network address of a second security server, the server list identifies the first security server as having a higher priority than the second security server; and the first security server is configured to participate in a subsequent security exchange with a second network device, wherein the first network device contacts the first security server during the subsequent security exchange using the first network address of the first security server in the server list.

21. The system of claim 20, wherein the first security server is configured to send the server list to the first network device, in response to the first network device presenting proper credentials to the first security server while participating in an authentication exchange.

22. The system of claim 20, wherein the first security server is configured to send the server list to the first network device, in response to the first network device presenting proper credentials to the first security server while participating in an authorization exchange.

23. The system of claim 20, wherein the server list comprises expiration information, and the first network device is configured to inhibit use of the server list if the expiration information indicates that the server list is expired.

24. A system comprising:

non-transitory computer readable storage means for storing a server list, wherein the server list comprises network addresses of two or more security servers, including a first network address of a first security server and a second network address of a second security server, and wherein the server list identifies the first security server as having a higher priority than the second security server; and security module means for:

participating as a supplicant in a security exchange, wherein the security module means receive the server list during the security exchange, and wherein the security module means store the server list in the non-transitory computer readable storage means in response to receipt of the server list, participating as an authenticator in a subsequent security exchange, wherein the security module means act as an authenticator to a network device, the security module means use the first network address of the first security server of the two or more security servers to contact the first security server during the subsequent security exchange and the security module means send the server list to the network device during the subsequent security exchange.

25. A system comprising:

non-transitory computer readable storage means for storing a server list, wherein the server list comprises network addresses of two or more security servers, including a first network address of a first security server and a second network address of a second security server, and wherein the server list identifies the first security server as having a higher priority than the second security server; and security module means for:

participating in a security exchange with a first network device, wherein the participating in the security exchange comprises sending the server list to the first network device, in response to detecting that the first network device is a secure network device, in response to the first network device providing proper credentials to the security module while participating in the security exchange, and participating in a subsequent security exchange with a second network device, wherein the first network device contacts the first security server during the subsequent security exchange using the first network address of the first security server in the server list.

* * * * *